United States Patent [19]

Lubitz

[11] Patent Number: 5,593,612
[45] Date of Patent: Jan. 14, 1997

[54] U, W, X, Y AND Z-TYPE FERRITES

[75] Inventor: Peter Lubitz, Great Falls, Va.

[73] Assignee: The United States of America as represented by the Secretary of the Navy, Washington, D.C.

[21] Appl. No.: 627,394

[22] Filed: Nov. 30, 1990

[51] Int. Cl.⁶ .................................................. C01G 49/08
[52] U.S. Cl. .......................... 252/62.56; 252/62.59
[58] Field of Search ........................... 252/62.56, 62.59

[56] References Cited

U.S. PATENT DOCUMENTS 4,698,182  10/1987  Nagai et al. ..................... 252/62.59

Primary Examiner—Charles T. Jordan
Assistant Examiner—Anthony Chi
Attorney, Agent, or Firm—Thomas E. McDonnell; Barry A. Edelberg

[57] ABSTRACT

A U, W, X, Y, or Z-type hexagonal ferrite and method for making such a ferrite are disclosed. The hexagonal ferrite has a formula as follows:

$$N_QZn_{2-z}Fe_{H-2x}Ti_xM_xO_EA_z$$

According to the method, the required weights of the oxides and carbonates are measured and then pulverized and mixed to form a material which is sintered in air. This material is then cooled to produce the U, W, X, Y, or Z-type hexagonal ferrite.

11 Claims, 3 Drawing Sheets

U, W, X, Y AND Z-TYPE FERRITES

FIELD OF THE INVENTION

The present invention relates generally to ferrites, and more particularly to a Z-type hexagonal ferrite for use in microwave applications having reduced temperature dependence of its magnetic anisotropy energy.

BACKGROUND OF THE INVENTION

Ferrites are useful for microwave applications because they interact with the magnetic component of electromagnetic radiation to produce losses and phase shifts which can be varied with an external magnetic field and which are frequency dependent. These properties make ferrites suitable for applications to circulators, modulators, isolators, phase shifters, and absorbers, among other applications.

The class of hexagonal ferrites with uniaxial magnetic symmetry contains ferrites whose natural resonant frequency can be chosen by selecting appropriate physical structures (e.g. M, W, Z, U . . . ) and by making chemical substitutions in the formula (e.g. ½ (CoTi), for Fe, or Co for Zn).

These modifications allow the greatest microwave activity (phase shift and attenuation) to be placed at the frequency ranges of interest. Examples of such uses are in radar absorbers and isolators.

A serious disadvantage of many of the substituted ferrites is that they employ Co ions. Co introduces a strong temperature dependence which shifts the resonant frequency by about 30 MHz/°C. near room temperature. In addition, Co has become relatively expensive. Without the use of Co, the known useful substitutions do not fill all of the frequency ranges of interest, subject to other constraints on their properties.

Various ferrites and methods for producing such ferrites have been disclosed in the prior art. For example, in U.S. Pat. No. 4,425,250 (Hibst), hexagonal ferrites and processes for producing such ferrites are disclosed. The hexagonal ferrites can be of the general formula $M^{+2}(Me^{+2}Ti^{+4})_2Fe_{12-2x}O_{19}$. Such hexagonal ferrites are produced by a ceramic process including mixing of the appropriate oxides, and heating at from about 1,100°–1,200° C. Thereafter, the sintered crystal-like conglomerates formed are milled, generally in the presence of water, to give a powder with a particle size about 1 micrometer. However, it should be appreciated that the milling creates crystal defects in the particles, resulting in poor magnetic properties. Other hexagonal ferrites of this type are disclosed in U.S. Pat. No. 4,664,831 (Hibst et al), U.S. Pat. No. 4,543,198 (Kamiyama), and U.S. Pat. No. 4,764,300 (Hibst et al). This latter patent further discloses the pre-sintering at 1,100°–1,300° C. and the partial curing of the crystal defects caused by milling by heating after the milling procedure or by sintering process.

In U.S. Pat. No. 4,561,988 (Nagai et al), a process for the production of a barium ferrite of the general formula $BaFe_{12-x-y}M_xTi_yO_{19}$ is disclosed. This process includes autoclaving of an aqueous suspension. Another similar hexaferrite is disclosed in U.S. Pat. No. 4,781,852 (Kacxur et al).

A method for producing hexagonal ferrites using a homogenous mixture of cations and one or more thermally decomposable anions is disclosed in U.S. Pat. No. 4,786,430 (Mair).

SUMMARY OF THE INVENTION

In accordance with the present invention, there is provided a U, W, X, Y, or Z-type hexagonal ferrite wherein at least a portion of the Fe is substituted for by ½(TiM), where M is Zn, $(Ni_tCo_u)$, Cu, Cd, Mn or a mixture thereof, $0<t\leq1$, $t+u=1$ and $0\leq u<1$, and a method of producing such ferrites.

The method for producing the hexagonal ferrite includes the initial step of measuring the required weights of the oxides and carbonates of the starting materials to give the correct stoichiometry and then pulverizing and mixing the measured starting ions. The pulverized and mixed starting ions form a material which is then calcined. This calcined material is then slowly cooled to produce the hexagonal ferrite.

In a preferred embodiment, the hexagonal ferrite produced is repulverized to particles are then sintered. Where the hexagonal ferrite is desired in a particular shape, the particles are pressed into a mold before the refiring step. Further, if the particles are to be used as a radar absorber, the particles are preferably all pulverized to about 1 micrometer.

Where the maximum amount of microwave activity is required, the particles are aligned with the crystallographic c axis perpendicular to microwave fields used in the application. For fine particles, this is easily accomplished using a magnetic field. For larger particles, considerable alignment is obtained by mixing the pulverized particles with a liquid and spreading the resultant mixture to a thickness of about 10 to 20 mils onto a flat substrate. Preferably, the liquid is ethyl alcohol.

It is an object of the present invention to produce a ferrite with reduced temperature dependence of its magnetic anisotropy energy which is used in microwave applications.

It is also an object of the present invention to provide a hexagonal ferrite which does not use either Co or Sc.

It is a further object of the present invention to provide a hexagonal ferrite which can be shifted over a range of frequencies as desired.

Other features and objects of the present invention are stated in or apparent from a detailed description of a presently preferred embodiment of the invention found hereinbelow.

DETAILED DESCRIPTION OF THE PREFERRED EMBODIMENT

Figure 1:
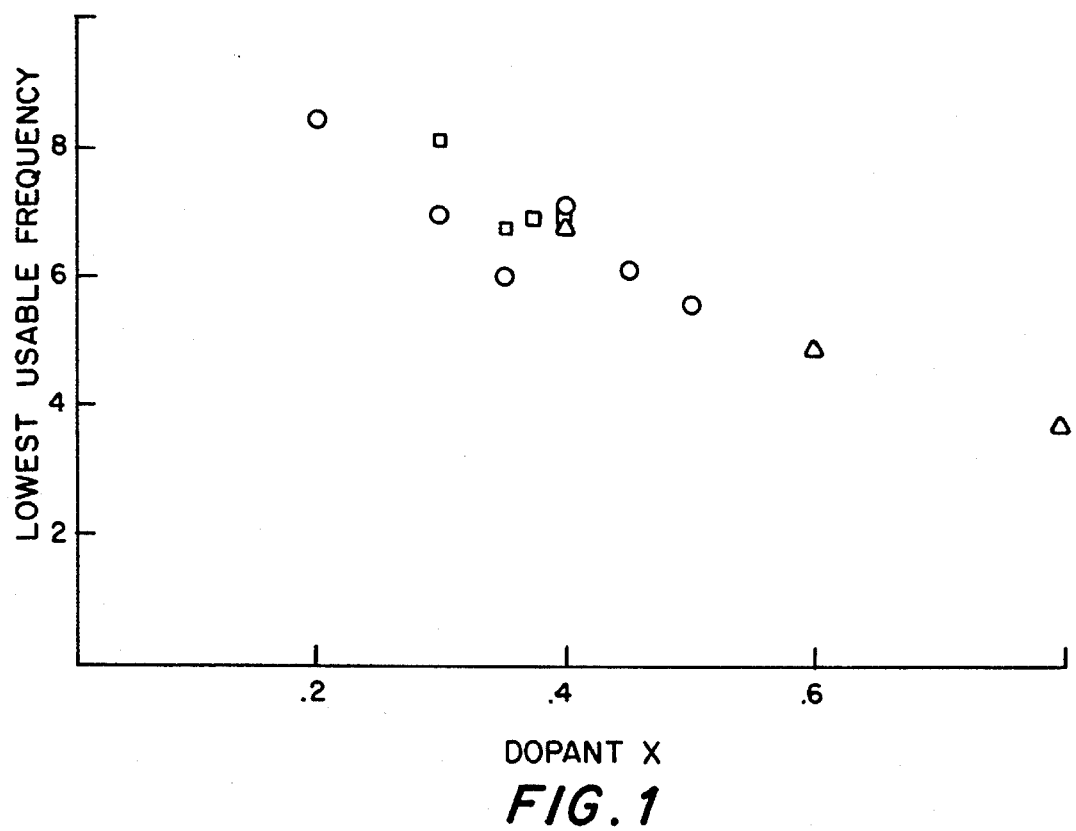
FIG. 1 is a graphical representation of a chemical substitution for Fe on the resonant frequency.

Preferably, the present invention is a hexagonal ferrite having the chemical formula:

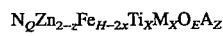

$$N_QZn_{2-z}Fe_{H-2x}Ti_xM_xO_EA_Z$$

where:
M is Zn, $(Ni_tCo_u)$, Cu, Cd, Mn or a mixture thereof
$0<t\leq1$;
$t+u=1$;
$0\leq u<1$;
N has an average +2 valence state and is one or more metals selected from the group consisting of Pb, Ba, Sr and Ca;

H is the number of Fe atoms in a molecule of a U, W, X, Y, or Z-type hexagonal ferrite without substitution for Fe or O (e.g., for a W type hexagonal ferrite, H is 16 and for a Z-type hexagonal ferrite, H is 24);

Q is the total number of N moieties in a molecule of a U, W, X, Y, or Z-type hexagonal ferrite (e.g., for a Z-type hexagonal ferrite where N is Pb, Ba, or a mixture thereof, Q is 3);

E is the number of O atoms in a molecule of a U, W, X, Y, or Z-type hexagonal ferrite without substitution for Fe or O (e.g., for a W type hexagonal ferrite, E is 27 and for a Z-type hexagonal ferrite, E is 41);

x is greater than zero and no more than 4;

A is selected from the group consisting of Co, Cu, Ni; and z is 0 to 2 and preferably 0 to 1.4.

For a Z-type hexagonal ferrite where N is Pb, Ba or a mixture thereof, for use as an isolator or similar device at 2 to 14 GHz, x is preferably 0 to 0.8 and more preferably x is 0.2 to 0.8.

Preferably, N is Pb, Ba or a mixture thereof. Also, M is preferably Zn.

In accordance with the present invention, the hexagonal ferrite is made according to a particular process. Initially, the starting materials consist of oxides or carbonates of the metal ions with the amounts accurately weighed to give the correct stoichiometry of the metal ions. These compounds are then thoroughly pulverized and mixed. The resultant material is then calcined in an atmosphere, such as air having sufficient oxygen that the Fe remains in the +3 valence (hereinafter referred to as a non-reducing atmosphere). The calcining temperature is not critical. Typically, the material is calcined at between 1200° and 1500° C., most often at about 1,275° C., for about four or more hours. The calcined material is then cooled slowly, for example at a rate of less than 100° C./hour. At this point, the reaction is partially complete, with about ⅔ of the yield being the desired hexagonal structure. However, further processing is useful if the maximum microwave activity is desired at a chosen frequency.

This further processing is accomplished by initially repulverizing the ferrite to a size small enough to permit good homogenization, but not small enough to significantly interfere with compression. Typically, the calcined and cooled material is pulverized to provide particles in the size range of 1 to 10 micrometers. The re-pulverized ferrite particles are then sintered in a non-reducing atmosphere, for example, for about 1 to several days at about 1275° C. to about 1325° C., to permit grain growth. The sintering temperature is not critical, although a sintering temperature which is too high could cause the material to lose $ZnO_2$. If the material is to be shaped, the material is pressed into a mold before the last firing.

For radar absorbing use, the refired particles are powdered down to about a 1 micrometer particle size, which does not effect the microwave properties appreciably.

If the maximum amount of microwave activity is required, the particles are aligned with their crystallographic c axis essentially perpendicular to the microwave magnetic fields used in the application. For fine particles, this is accomplished by applying a magnetic field along the direction in which the c axis is desired to lie. In most hexagonal ferrites, alignment can be achieved in a magnetic of about 4 kGauss. Magnetic fields of greater magnitude can be used, but will not achieve further alignment. For larger pieces, considerable alignment is attained by using a coarser particle size before the last firing, and then mixing the powdered ferrite with a liquid such as ethyl alcohol. This mixture is then spread to a thickness of about 10 to 20 mils onto flat substrates.

FIG. 1 depicts the effect of the chemical substitution ½(TiZn) for Fe in the chemical formula shown above on the resonant frequency of a Z-type ferrite where N is Ba, z is 0 and x is as indicated on the x-axis. The resonant frequency is defined as the frequency at which the microwave losses are a maximum.

Figure 2:
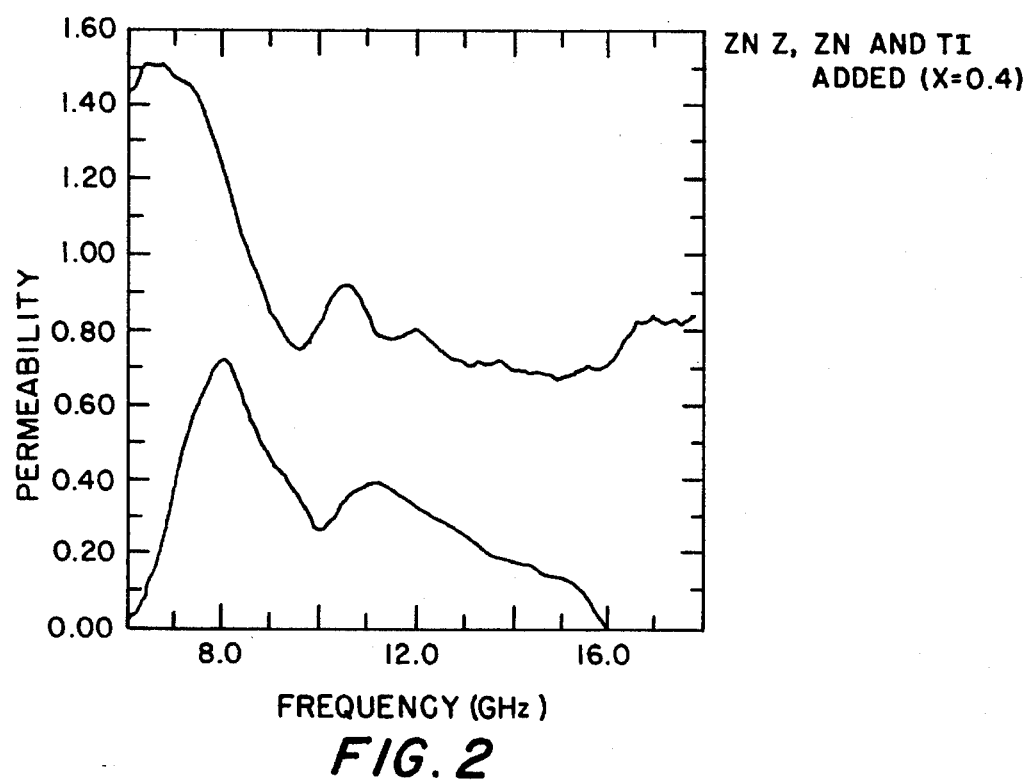
FIG. 2 is a graphical representation of the frequency dependency of microwave permeability.
Figure 3:
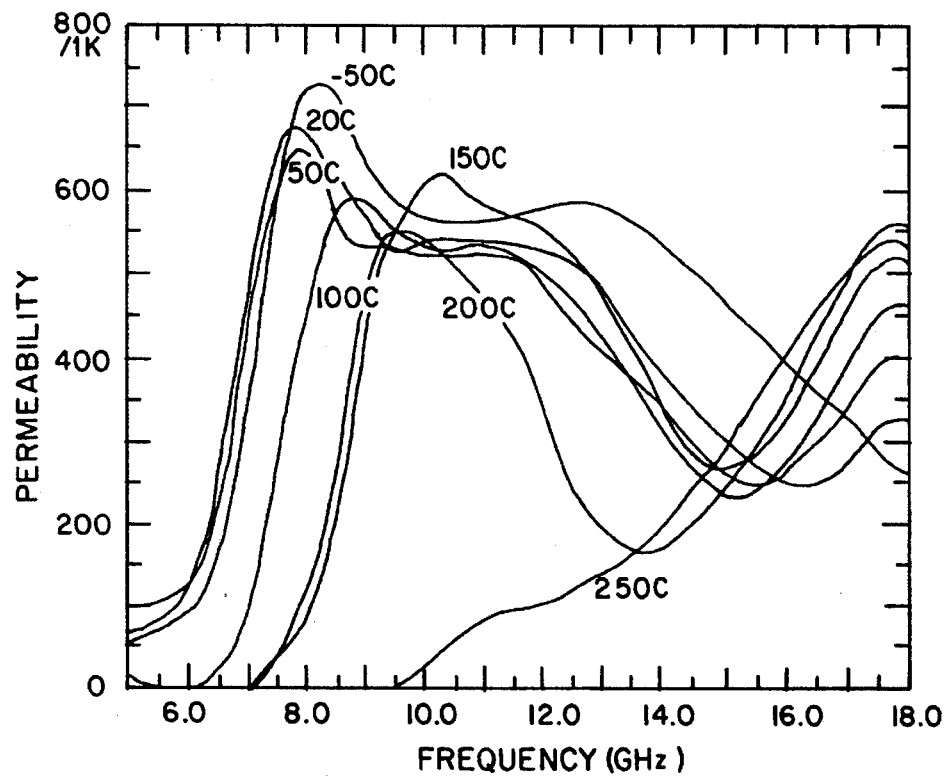
FIG. 3 is a graphical representation of the frequency dependency of microwave permeability for other samples.

FIG. 2 shows the frequency dependence of the microwave permeability for samples of a Z-type ferrite according to the present invention where M is Zn, N is Ba, z is 0 and x equal 0.4. The shape of the spectra is essentially the same for other x up to about 1.4. However, the spread of the features decreases monotonically with x, being proportional to the saturation magnetization, M, as shown in FIG. 3. After x becomes too large, the material lacks useful magnetic properties.

It should be appreciated that the use of Ti and Zn together in the U, W, X, Y, or Z-type hexagonal ferrites of the present invention allow these ions to occupy sites that they would not otherwise be able to occupy. While similar substitutions have been used in the M-type ferrites, the occurrence of Zn in the +2 sites of the Zn-U, W, X, Y, or Z structure inhibited further investigations of the effects of Zn substitutions.

Figure 4:
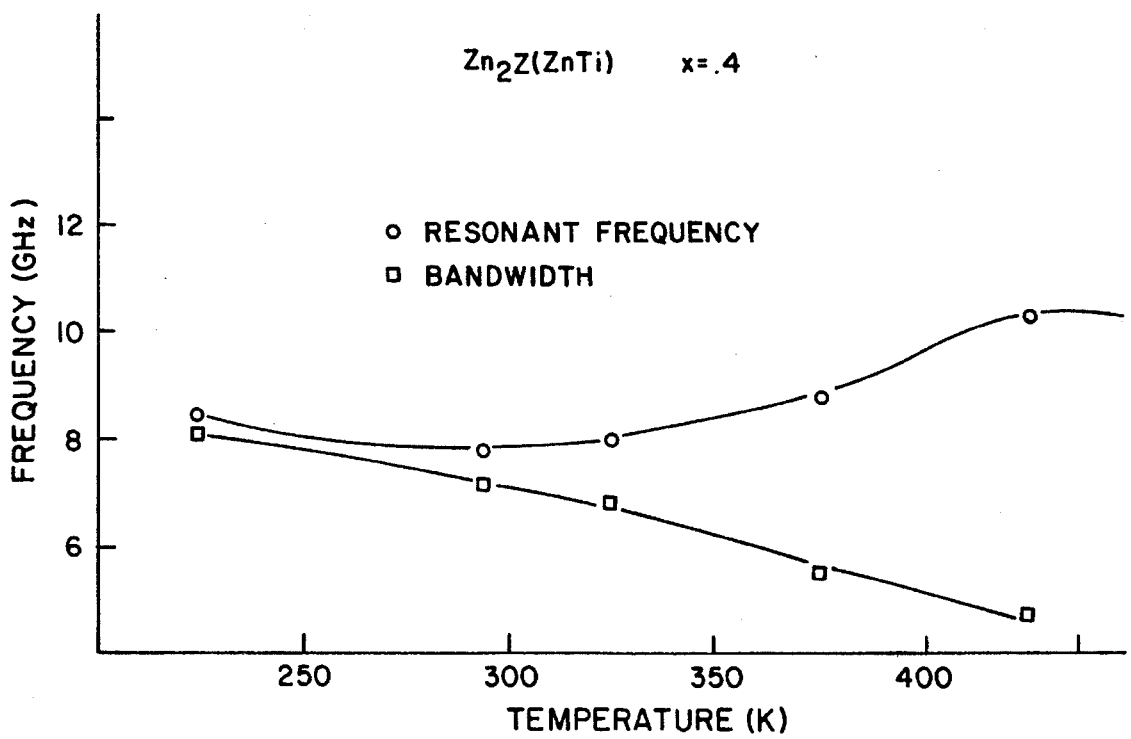
FIG. 4 is a graphical representation of the effect of the present invention in reducing temperature dependence.

It is thus an advantage of the present invention that the resonant frequency, and thus the frequency of operation for radar absorption, or for a resonant isolator, is shifted over the range of frequencies as shown in FIG. 1 without the need to use Co or Sc. The main objection to Sc is its cost, but in addition to cost, Co introduces a strong temperature dependence which shifts the resonant frequency by about 30 MHz/° C. near room temperature, but this shift can be compensated for by the co-substitution of Ni. The effect of the substitution described by the present invention in reducing the temperature dependence of the resonance frequency in a Z-type ferrite is shown in FIGS. 3 and 4 for M=Zn, N=Ba, z=0 and x=0.4. The practical bandwidth is also shown in this figure, i.e., the frequency range over which at least 10 dB of return loss is realized in a radar absorbing material less than about 120 mils thick. The temperature coefficient of resonance frequency apparently goes to zero for temperatures near ambient.

Figure 5:
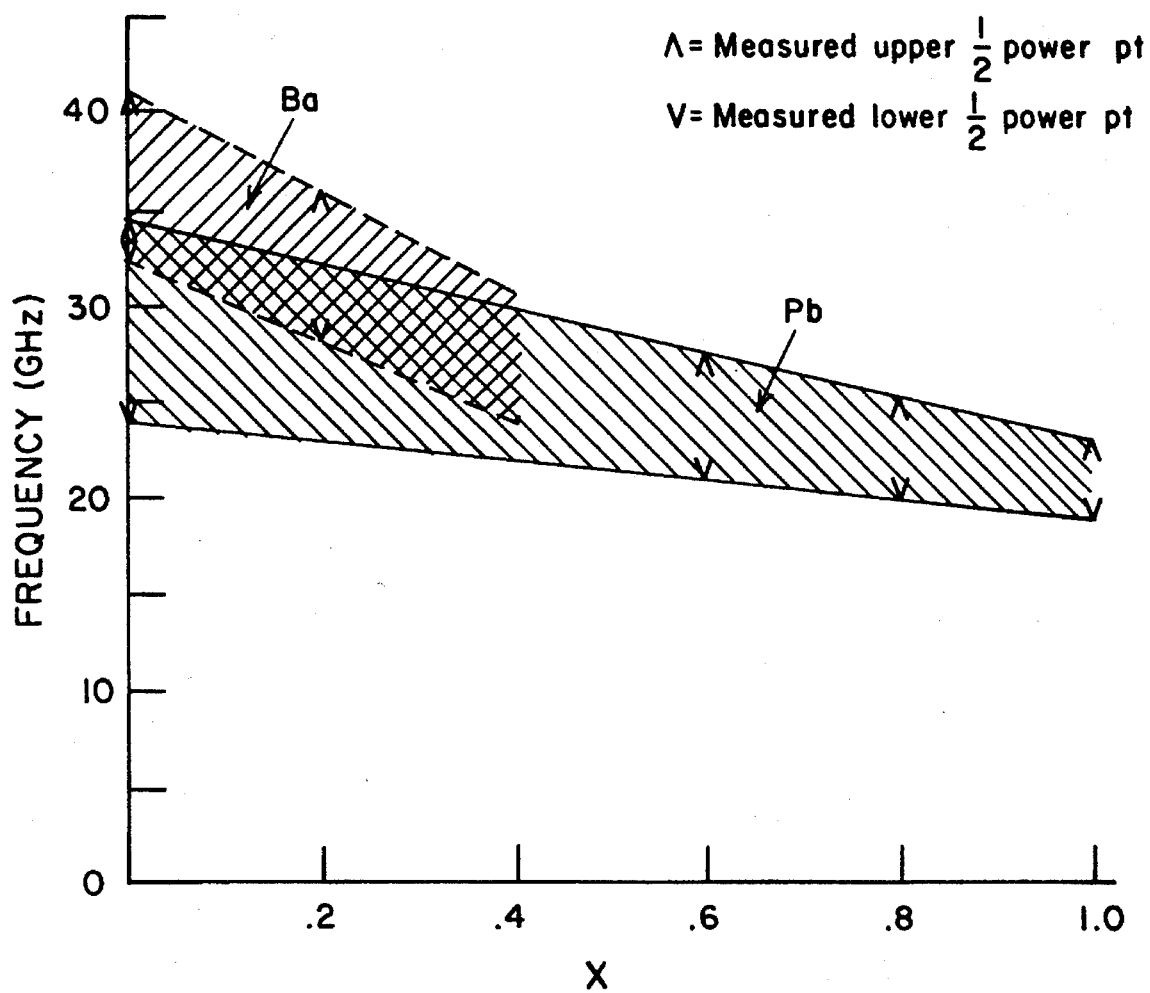
FIG. 5 is a graphical representation showing the range of useful frequencies for W-type hexagonal ferrites according to the present invention as x varies between 0 and 1.0.

FIG. 5 shows the effects of the chemical substitution ½(ZnTi) for Fe, in W-type hexagonal ferrites, on the microwave properties. The region between the solid curves and between the dashed curves, shows the region of appreciable magnetic losses (½ power points) for Pb- and Ba-based W-type compounds, respectively, where z is 0 and x is as indicated on the x-axis. The width of the region is proportioned to M, and decreases somewhat with increasing x. It is seen that these substitutions allow the microwave activity to be shifted freely through most of the 2 microwave bands: 18–26.5 and 26.5–40 GHz.

Other ions have been shown to produce effects similar to Zn when substituted into U, W, X, Y, or Z hexagonal ferrites. In particular, Cu, Ni, Mn, as well as other combinations of ions such that the net valence is +3 have been used to produce similar effects in W and Z-type hexagonal ferrites. However, these ions have effects which differ slightly from Zn and thus are not as useful. For example, $Cu_2Z(TiCu)$ has a higher resonant frequency than a Zn compound of the present invention. In addition, Cu and Ni both have the effect of raising the Curie temperature, but at the expense of a room temperature saturation magnetization. However, it should be appreciated that if it is desired that the temperature at which the coefficient of resonant frequency with respect to temperature be zero at some temperature other than about 20° C., this temperature can be raised with the addition of Ni or lowered with the addition of Co as a substitute for some of the Zn.

While the present invention has been described with respect to an exemplary embodiment thereof, it will be understood by those of ordinary skill in the art that variations and modifications can be effected within the scope and spirit of the invention.

What is claimed is:

1. A U, W, X, Y, or Z-type hexagonal ferrite of the formula $$N_Q Zn_{2-z} Fe_{H-2x} Ti_x M_x O_E A_z$$

where:

M is Zn, (Ni$_t$Co$_u$), Cu, Cd, Mn or a mixture thereof;

$0 < t \leq 1$;

$t + u = 1$;

$0 \leq u < 1$;

N has an average +2 valence state and is selected from the group consisting of Pb, Ba, Sr and mixtures thereof;

Q is the total number of N atoms in a molecule of a U, W, X, Y, or Z-type hexagonal ferrite;

H is the number of Fe atoms in a molecule of a U, W, X, Y, or Z-type hexagonal ferrite without substitution for Fe or O;

E is the number of O atoms in a molecule of a U, W, X, Y, or Z-type hexagonal ferrite without substitution for Fe or O;

x is greater than zero and no more than 4;

A is selected from the group consisting of Co, Cu, Ni; and z is 0 to 2.

2. A U, W, X, Y, or Z-type hexagonal ferrite as claimed in claim 1 wherein x is between 0.2 and 0.8.

3. A U, W, X, Y, or Z-type hexagonal ferrite as claimed in claim 1 wherein M is Zn.

4. A U, W, X, Y, or Z-type hexagonal ferrite as claimed in claim 3, wherein N is at least one member of the group consisting of Pb and Ba.

5. A U, W, X, Y, or Z-type hexagonal ferrite as claimed in claim 1, wherein N is at least one member of the group consisting of Pb and Ba.

6. A Z-type hexagonal ferrite according to claim 5, wherein N is Ba.

7. A Z-type hexagonal ferrite according to claim 1.

8. A W-type hexagonal ferrite according to claim 1.

9. A W-type hexagonal ferrite according to claim 5.

10. A X-type hexagonal ferrite according to claim 1.

11. A Y-type hexagonal ferrite according to claim 1.

* * * * *